US012783086B2

(12) United States Patent
Mikami et al.

(10) Patent No.: US 12,783,086 B2
(45) Date of Patent: Nov. 3, 2026

(54) ELECTRONIC DEVICE, METHOD FOR CONTROLLING ELECTRONIC DEVICE, AND NON-TRANSITORY COMPUTER-READABLE MEDIUM

(71) Applicant: KYOCERA Corporation, Kyoto (JP)

(72) Inventors: Ayako Mikami, Yamato (JP); Takahiro Ishii, Yokohama (JP); Tomoya Katsumata, Sagamihara (JP); Akira Shouji, Kawasaki (JP); Masatoshi Nojiri, Yokohama (JP); Shigeki Tanabe, Yokohama (JP); Shinya Kosai, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 19/229,439

(22) Filed: Jun. 5, 2025

(65) Prior Publication Data

US 2025/0383737 A1 Dec. 18, 2025

(30) Foreign Application Priority Data

Jun. 17, 2024 (JP) ................................ 2024-097672

(51) Int. Cl.
*G06Q 20/32* (2012.01)
*G06F 3/01* (2006.01)
(Continued)

(52) U.S. Cl.
CPC ............ *G06F 3/0418* (2013.01); *G06F 3/017* (2013.01); *G06F 3/04886* (2013.01);
(Continued)

(58) Field of Classification Search
None
See application file for complete search history.

(56) References Cited

U.S. PATENT DOCUMENTS 9,576,285 B2 * 2/2017 Zhou ........................ H04W 4/80
10,394,380 B2 8/2019 Horikoshi et al.
(Continued)

FOREIGN PATENT DOCUMENTS

JP 2017-228173 A 12/2017

*Primary Examiner* — Krishna P Neupane
(74) *Attorney, Agent, or Firm* — Studebaker Brackett PLLC

(57) ABSTRACT

An electronic device includes a detector, a controller, and a communicator. The detector is configured to detect an object in proximity or contact. The controller is configured to accept a manual operation corresponding to the proximity or contact of an object. The communicator is disposed to allow for communication with a communication device brought into proximity from a detection surface side. The detection surface has first and second detection regions. The first detection region includes a range obtained by projecting onto the detection surface a region that is less than a detection distance from the detection surface from out of a region of communication availability between the communication device and the communicator. In a period of communication processing between the communicator and the communication device, the controller is configured to limit manual input in the first detection region, but to accept manual input in the second detection region.

20 Claims, 7 Drawing Sheets

(51) Int. Cl.

| | |
|---|---|
| ***G06F 3/041*** | (2006.01) |
| ***G06F 3/04886*** | (2022.01) |
| ***G06Q 20/34*** | (2012.01) |

(52) U.S. Cl.

CPC ....... *G06Q 20/3278* (2013.01); *G06Q 20/352* (2013.01); *G06F 2203/04108* (2013.01)

(56) References Cited

U.S. PATENT DOCUMENTS

| | | | | |
|---|---|---|---|---|
| 10,628,820 | B2 * | 4/2020 | Wyatt .................. | G06Q 20/341 |
| 2024/0345684 | A1 * | 10/2024 | Uwai ....................... | H04B 5/72 |

* cited by examiner

ELECTRONIC DEVICE, METHOD FOR CONTROLLING ELECTRONIC DEVICE, AND NON-TRANSITORY COMPUTER-READABLE MEDIUM

CROSS REFERENCE TO RELATED APPLICATION

The present invention contains subject matter related to Japanese Patent Application No. 2024-97672 filed in the Japan Patent Office on Jun. 17, 2024, the entire contents of which are incorporated herein by reference.

BACKGROUND OF THE INVENTION

1. Field of the Invention

The present disclosure relates to an electronic device, a method for controlling an electronic device, and a non-transitory computer-readable medium.

2. Description of the Related Art

As described in Japanese Patent Laid-Open No. 2017-228173, a known electronic device lowers the detection sensitivity of a touchpad when another NFC coil comes into proximity and communicates with an NFC coil located underneath the touchpad.

SUMMARY OF THE INVENTION

In one embodiment, an electronic device is provided. The electronic device includes a detector, a controller, and a communicator. The detector is configured to detect an object in proximity of less than a detection distance from, or in contact with, a detection surface. The controller is configured to accept a manual operation corresponding to the proximity or contact of an object with the detector. The communicator is disposed to allow for communication with a communication device brought into proximity with the detector from the detection surface side. The detection surface has first and second detection regions. The first detection region includes a range obtained by projecting onto the detection surface a region that is less than the detection distance from the detection surface from out of a region of communication availability between the communication device and the communicator. The second detection region does not include the first detection region. In a period of communication processing between the communicator and the communication device, the controller is configured to limit manual input corresponding to the detection of the proximity or contact of an object with the first detection region, but to accept manual input corresponding to the detection of the proximity or contact of an object with the second detection region.

In one embodiment, a method for controlling an electronic device is provided. The electronic device includes a detector, a controller, and a communicator. The detector is configured to detect an object in proximity of less than a detection distance from, or in contact with, a detection surface. The controller is configured to accept a manual operation corresponding to the proximity or contact of an object with the detector. The communicator is disposed to allow for communication with a communication device brought into proximity with the detector from the detection surface side. The detection surface has first and second detection regions. The first detection region includes a range obtained by projecting onto the detection surface a region that is less than the detection distance from the detection surface from out of a region of communication availability between the communication device and the communicator. The second detection region does not include the first detection region. The method for controlling an electronic device includes causing, in a period of communication processing between the communicator and the communication device, the controller to limit manual input corresponding to the detection of the proximity or contact of an object with the first detection region, but to accept manual input corresponding to the detection of the proximity or contact of an object with the second detection region.

In one embodiment, a non-transitory computer-readable medium is provided. The non-transitory computer-readable medium stores a control program of an electronic device. The electronic device includes a detector, a controller, and a communicator. The detector is configured to detect an object in proximity of less than a detection distance from, or in contact with, a detection surface. The controller is configured to accept a manual operation corresponding to the proximity or contact of an object with the detector. The communicator is disposed to allow for communication with a communication device brought into proximity with the detector from the detection surface side. The detection surface has first and second detection regions. The first detection region includes a range obtained by projecting onto the detection surface a region that is less than the detection distance from the detection surface from out of a region of communication availability between the communication device and the communicator. The second detection region does not include the first detection region. The control program of an electronic device includes causing, in a period of communication processing between the communicator and the communication device, the controller to limit manual input corresponding to the detection of the proximity or contact of an object with the first detection region, but to accept manual input corresponding to the detection of the proximity or contact of an object with the second detection region.

DESCRIPTION OF THE PREFERRED EMBODIMENTS

Figure 1:
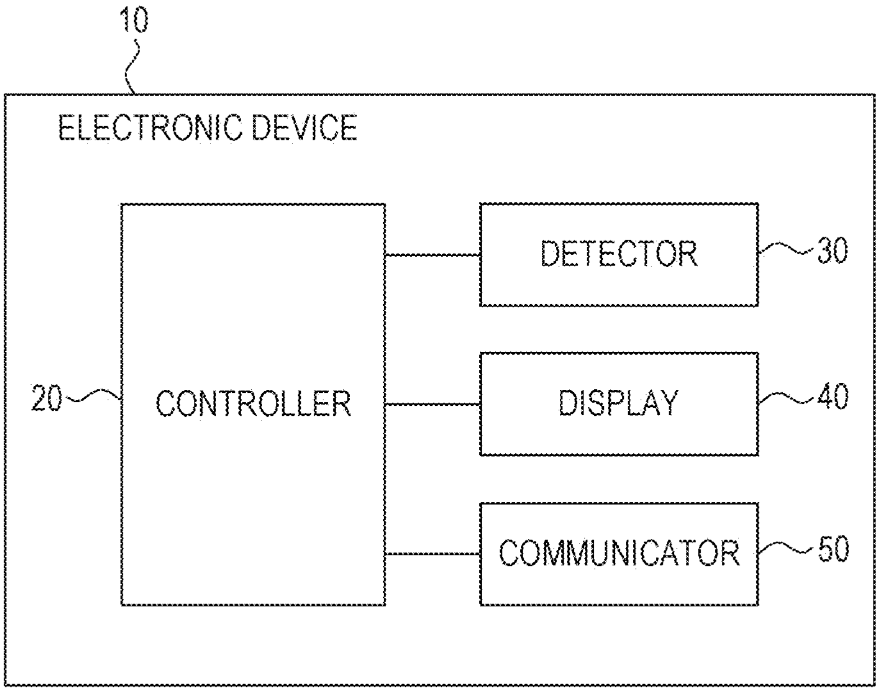
FIG. 1 is a block diagram illustrating an example configuration of an electronic device according to the present disclosure.

If the detection sensitivity of a touchpad is lowered while short-range or proximity communication is in progress, touch operations may not be detectable while short-range communication or proximity communication is in progress. Improvement is desired in the convenience of touch operations for devices that execute short-range or proximity communication. The present disclosure provides an electronic device, a method for controlling an electronic device, and a non-transitory computer-readable medium that allow for more convenient touch operations for devices that execute short-range or proximity communication.

Contactless payment is a known technology for performing short-range or proximity communication by holding a physical credit card or a communication device built into a mobile terminal up to a payment terminal. A protocol such as near field communication (NFC) or radio-frequency identification (RFID) may be used as the communication for contactless payment. Mobile Payments on COTS (MPoC) is also gaining traction. MPoC is a standard that allows commercial off-the-shelf (COTS) devices such as tablets or smartphones sold to general consumers to be used as contactless payment terminals.

Improving the user convenience of contactless payment demands that customers paying by contactless payment can easily understand the part of a payment terminal where the customer is to hold up a credit card, mobile terminal, or the like. For example, in the case of a tablet or a smartphone, the communication device may be installed on the side opposite from a touchscreen, or in other words, on the back side. When a device having a communication device installed on the back side is used as a payment terminal, the payment terminal is set up so that the payment amount and other information are displayed on the touchscreen, which means that the back side is not visible to the customer. This may require an explanation or a question-and-response to help the customer understand that the customer's credit card or mobile terminal is to be held up to the back side of the payment terminal, which is not visible to the customer. As a result, convenience is impaired.

One conceivable solution is to install the communication device on the touchscreen side, or in other words, on the front side. In this case, the customer's credit card or mobile terminal can be held up to the touchscreen, which is the portion of the payment terminal that is visible to the customer. With this arrangement, an explanation or question-and-response is probably unnecessary, and convenience is improved.

However, when performing contactless payment on the touchscreen side, the touchscreen could possibly detect the proximity of the credit card or mobile terminal as a touch operation not intended by the customer. Noise from the communication device during the communication for contactless payment could also cause the touchscreen to malfunction and possibly detect a touch operation not intended by the customer.

To avoid the detection of touch operations not intended by the customer during contactless payment, a conceivable solution is to lower the detection sensitivity or disable the detection of touch operations over the entire touchscreen during contactless payment. On the other hand, functionality to accept touch operations even during contactless payment is also desired. For example, one desired functionality is to accept touch operations for modifying the payment amount and/or canceling the transaction after contactless payment has begun. A preferable contactless payment configuration would be capable of both accepting touch operations and avoiding touch operations not intended by the customer. In other words, improvement is desired in the convenience of touch operations for contactless payment terminals and other such devices that execute short-range or proximity communication.

The following describes an exemplary embodiment of an electronic device 10 (see FIG. 1) that allows for improved convenience of touch operations while short-range or proximity communication is in progress. The following also describes exemplary embodiments of a control method and a control program for the electronic device 10.

Example Configuration of Electronic Device 10

As illustrated in FIG. 1, the electronic device 10 is provided with a controller 20, a detector 30, a display 40, and a communicator 50.

The controller 20 may include at least one processor to provide control and processing power for executing various functions of the electronic device 10. The functions of the controller 20 may be achieved by a single processor or by several processors. The processor may be achieved as a single integrated circuit (IC). The processor may be achieved as a plurality of communicatively connected integrated circuits or discrete circuits. The processor may be achieved on the basis of any of various other known technologies.

The processor may include a general-purpose processor that loads a specific program to execute a specific function, or a special-purpose processor dedicated to a specific process. The general-purpose processor may include a central processing unit (CPU) or a digital signal processor (DSP), for example. The special-purpose processor may include an application-specific integrated circuit (ASIC). The processor may include a programmable logic device (PLD). The PLD may include a field-programmable gate array (FPGA). The controller 20 may also include a system-on-a-chip (SoC) or a system in a package (SiP) in which one or more processors cooperate.

The electronic device 10 may include storage. The storage may include an electromagnetic storage medium such as a magnetic disk, or a memory such as semiconductor memory or magnetic memory. The storage stores various information. The storage stores, for example, a program to be executed by a processor or the like that functions as the controller 20. The storage may also be configured as a non-transitory readable medium. The storage may function as a working memory of the controller 20. At least a portion of the storage may be integrated with the controller 20.

The detector 30 is a touch sensor that detects the proximity or contact of an object. The detector 30 may be a touch panel that outputs a position where the proximity or contact of an object is detected. The touch sensor may employ a resistive, capacitive, ultrasonic, or optical method as the detection method, for example, but is not limited to the above and may also employ any of various other methods.

The display 40 may be provided with a display device such as a display panel. The display panel may include any of various types of panels, such as a liquid crystal display (LCD) panel, an organic electroluminescence (EL) panel, or an inorganic EL panel.

The communicator 50 executes short-range communication or proximity communication. The communicator 50 may include an NFC or RFID communication device, for example. The communicator 50 is not limited to these examples and may include any of various communication devices capable of executing short-range communication or proximity communication.

The electronic device 10 may be provided with an input device such as a hardware key. The electronic device 10 may also be provided with any of various sensors, such as an acceleration sensor or a proximity sensor.

Figure 2:
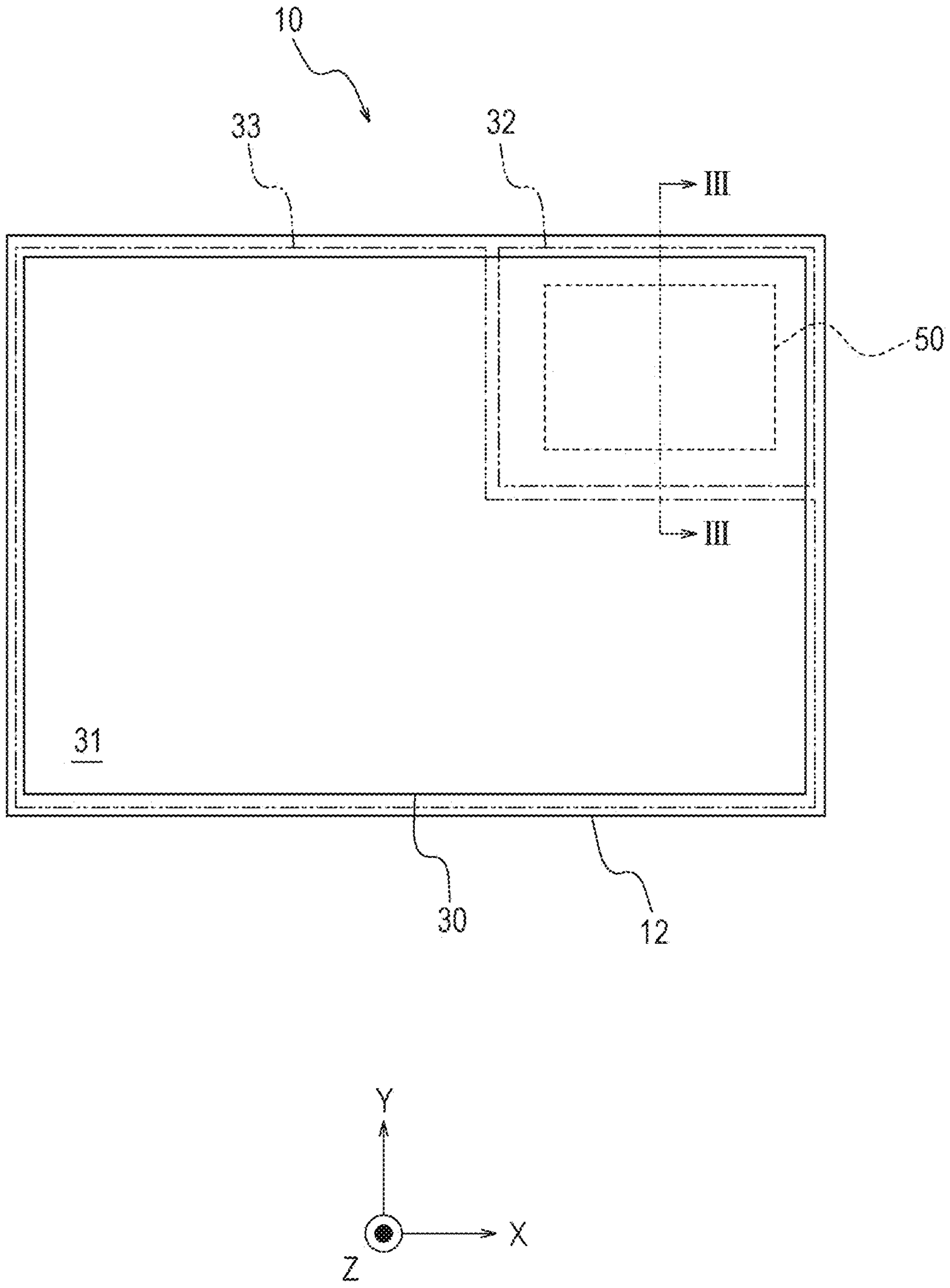
FIG. 2 is a plan view illustrating an example configuration of an electronic device according to the present disclosure.
Figure 3:
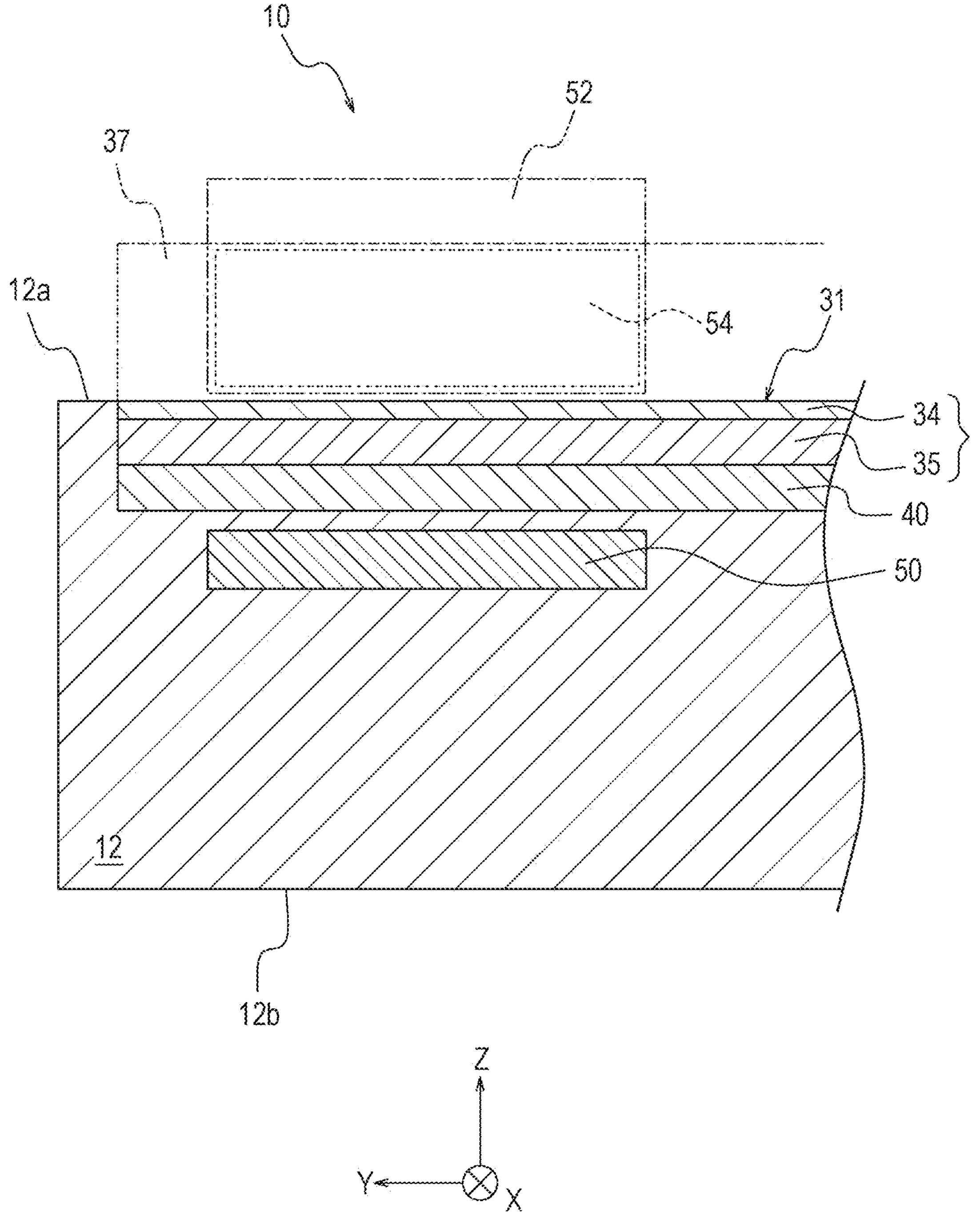
FIG. 3 is a cross section taken along line III-III in FIG. 2.

As illustrated by way of example in FIGS. 2 and 3, in the present disclosure, the electronic device 10 is provided with an enclosure 12. The enclosure 12 has a tabular shape that spreads out over the XY plane. A first surface **12*a* of the enclosure 12 located in the positive Z-axis direction corresponds to the front surface of the electronic device 10. A second surface 12***b* of the enclosure 12 located in the negative Z-axis direction of the enclosure 12 corresponds to the back surface of the electronic device 10.

The electronic device 10 is provided with a touchscreen, which is an integrated layering of a touch panel, namely the detector 30, and a display panel, namely the display 40. The touchscreen is located on the front side of the electronic device 10. The detector 30 is provided with a cover 34 and an electrode board 35. The cover 34 has a detection surface 31. The detector 30 detects an object that has come into proximity inside a detection availability region 37, or an object that has contacted the detection surface 31. The detection availability region 37 is the region within which the distance from the detection surface 31 is a detection distance or less. The detection distance may be set as appropriate. A short detection distance corresponds to low detection sensitivity of the detector 30. That is, the detection sensitivity of the detector 30 may be adjusted by changing the detection distance. The detector 30 may output a position where an object is detected as coordinates on the detection surface 31 when the position is projected onto the detection surface 31.

The electronic device 10 is provided with the communicator 50, which is installed at a position closer to the first surface 12*a* than to the second surface 12*b*, or in other words, on the front side of the electronic device 10. Installing the communicator 50 on the front side of the electronic device 10 creates a communication availability region 52 on the front side of the electronic device 10. Communication with the communicator 50 is available within the communication availability region 52. As a result, a communication device that is to communicate with the communicator 50 can execute short-range or proximity communication with the communicator 50 when the communication device is held up to the front side of the electronic device 10, within the communication availability region 52. In other words, the communicator 50 is disposed to allow for communication with a communication device brought into proximity from the detection surface 31 side of the detector 30. In the case of using the electronic device 10 as a payment terminal, payment convenience is improved if payment can be executed by holding up a credit card or a mobile terminal to the front side that is visible to the customer.

The communication availability region 52 overlaps at least a portion of the detection availability region 37. The overlapping region is represented as an overlap region 54. The distance along the Z axis from the detection surface 31 to the edge of the communication availability region 52 is also referred to as the communication availability distance. The communication availability distance may be equal to or shorter than the detection distance. When the communication availability distance is equal to or shorter than the detection distance, the entirety of the communication availability region 52 is contained in the detection availability region 37. The communication availability distance may be longer than the detection distance. When the communication availability distance is longer than the detection distance, a portion of the communication availability region 52 is contained in the detection availability region 37. A customer using contactless payment holds up a credit card or a mobile terminal within the range of the communication availability region 52. Consequently, regardless of the relative lengths of the communication availability distance and the detection distance, situations may occur where a credit card or a mobile terminal is brought into proximity with the detection availability region 37 or into contact with the detection surface 31 at the time of contactless payment.

The shape of the communication availability region 52 is rectangular in a cross-sectional view, as illustrated by way of example in FIG. 3, but is not limited thereto. The communication availability region 52 may have a shape whose area gets smaller with increasing distance from the detection surface 31, or in other words a trapezoidal shape. The communication availability region 52 may also have a shape whose area gets bigger with increasing distance from the detection surface 31, or in other words an inverted trapezoidal shape.

When viewing the electronic device 10 in the negative Z-axis direction as illustrated in FIG. 2, or in other words, in a plan view of the electronic device 10, the detector 30 is divided into a first detection region 32 and a second detection region 33. The first detection region 32 includes the region where the communicator 50 is installed. The first detection region 32 may be the region containing the range of the overlap region 54 projected onto the detection surface 31.

The second detection region 33 does not include the first detection region 32. The detector 30 may be configured to control a detection distance in the first detection region 32 and a detection distance in the second detection region 33 independently of each other.

Example Operations by Electronic Device 10

The following describes example operations in the case of using the electronic device 10 as a payment terminal. The controller 20 of the electronic device 10 executes an application program that provides a contactless payment function. The controller 20 accepts manual operations by a user of the electronic device 10 on the basis of a detection result from the detector 30 regarding the proximity or contact of an object. Specifically, the controller 20 displays, on the display 40, buttons corresponding to manual operations with respect to the electronic device 10. If the proximity or contact of an object, such as the user's finger, is detected at the display position of a button, the controller 20 determines that a manual operation corresponding to that button has been entered, and executes processing on the basis of the entered manual operation. The user of the electronic device 10 may be an employee of a store that accepts payments by contactless payment, or a customer who pays a fee by contactless payment.

Figure 4:
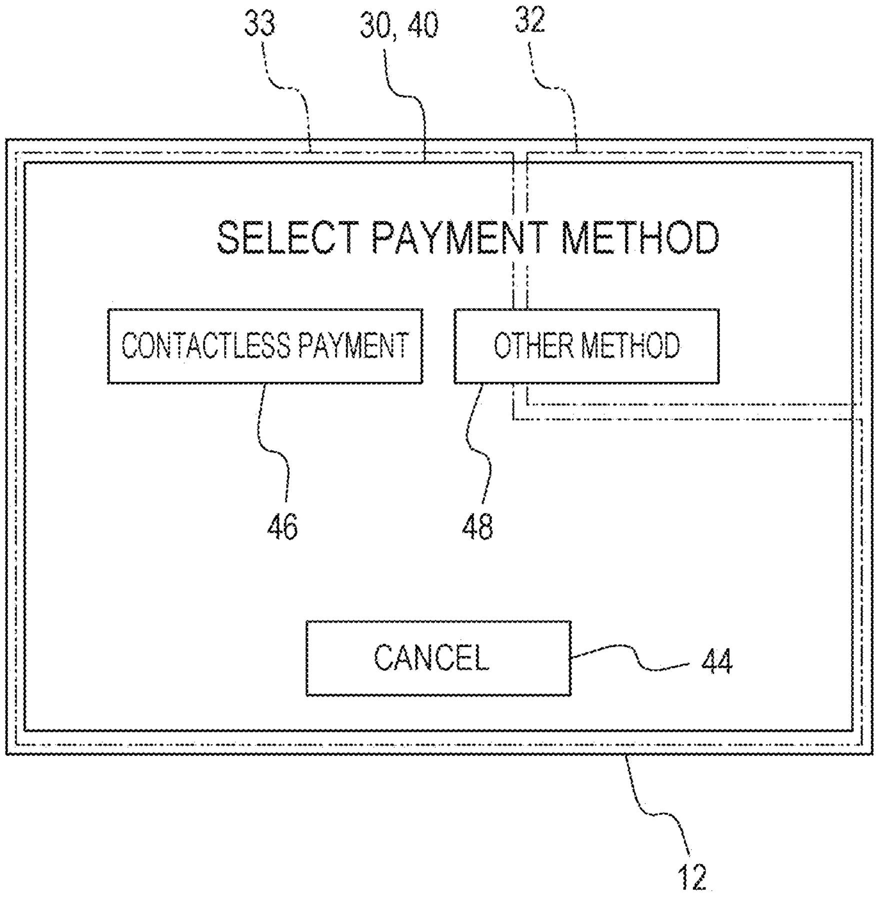
FIG. 4 is an example of a payment method selection screen.

The controller 20 may display the payment method selection screen illustrated in FIG. 4, for example. The payment method selection screen is displayed on the display 40, which is located on top of or under the detector 30. The payment method selection screen includes a contactless payment button 46 for selecting contactless payment by a credit card or a mobile terminal, and a cancel button 44 for canceling a selected payment method. The payment method selection screen may further include an other method button 48 for selecting another method. The other method may be code payment using a two-dimensional code or the like, but is not limited thereto. The numbers of manual operation buttons and their arrangement are not limited to the example in FIG. 4.

While the payment method selection screen is being displayed on the display 40, or in other words before contactless payment is started, the controller 20 accepts manual input in response to the detection of the proximity or contact of an object in both the first detection region 32 and the second detection region 33. That is, the controller 20 does not limit manual input in response to the detection of the proximity or contact of an object before contactless payment is started. For example, manual input with respect to the other method button 48 located in the first detection region 32 is not limited. By not limiting manual input before contactless payment is started, the arrangement of manual operation buttons may be changed to various other arrangements not limited to the example in FIG. 4. In other words, this affords a higher degree of freedom in the arrangement of manual operation buttons. This improves the convenience of the electronic device 10 as a result.

Figure 5:
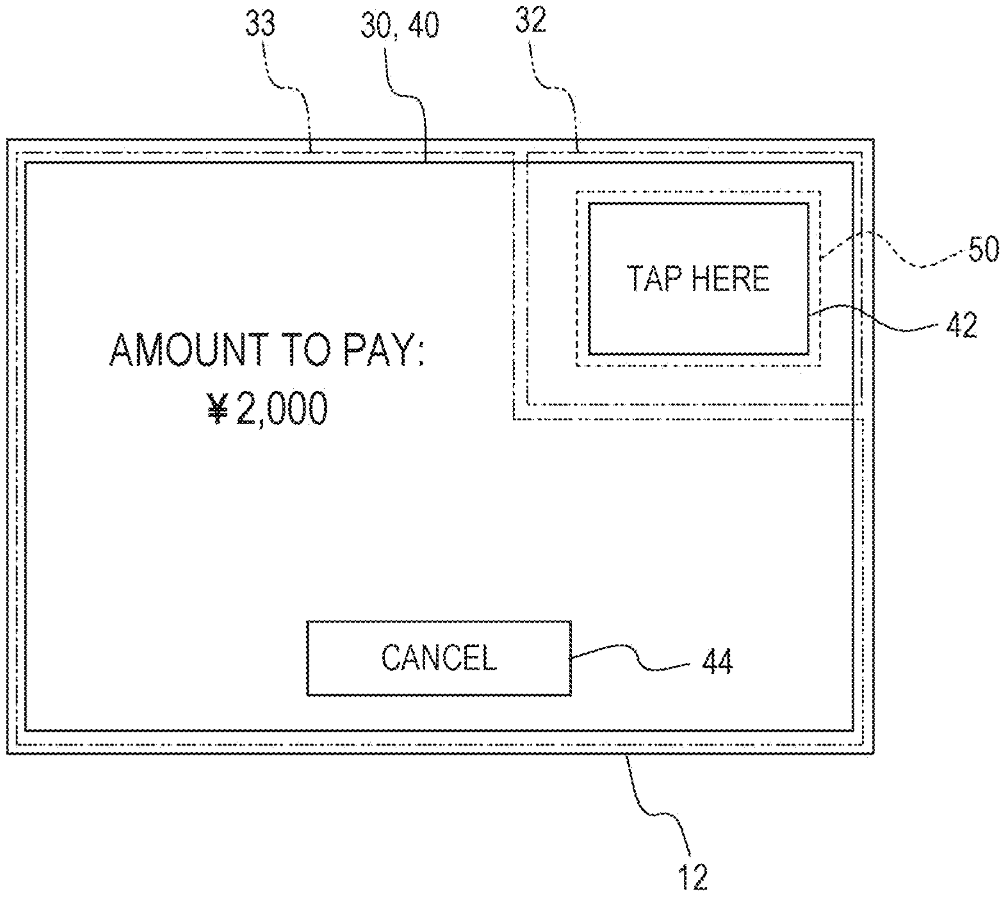
FIG. 5 is an example of a contactless payment screen.

Upon detecting that the customer's finger has come into proximity or contact with the contactless payment button 46, the controller 20 determines that a manual operation of selecting contactless payment has been entered, and may display the contactless payment screen illustrated by way of example in FIG. 5. The contactless payment screen is displayed on the display 40, which is located on top of or under the detector 30. The contactless payment screen includes the display of an amount to pay by contactless payment.

The contactless payment screen includes a tap region indication frame 42, or in other words a guide, that indicates the region where the customer is to tap a credit card or a mobile terminal. The tap region indication frame 42 is displayed in a region that overlaps the communication availability region 52 of the communicator 50 in a plan view of the electronic device 10. The tap region indication frame 42 may be displayed in the range of the overlap region 54 projected onto the detection surface 31. In the example in FIG. 5, the words "Tap here" are displayed in the tap region indication frame 42. The content to be displayed in the tap region indication frame 42 may also be other words, and may also be a figure, image, or the like such as a symbolic mark representing the position to tap.

The contactless payment screen includes a cancel button 44 for canceling contactless payment.

Once the contactless payment screen is displayed on the display 40, the controller 20 starts contactless payment by the communicator 50. To perform contactless payment, a credit card or a mobile terminal may be held up to the overlap region 54 where the communication availability region 52 and the detection availability region 37 overlap (see FIG. 3). When performing contactless payment, if the controller 20 accepts manual input in response to the detection of the proximity or contact of an object with the first detection region 32, manual input not intended by the customer may be accepted.

Accordingly, to avoid accepting manual input not intended by the customer after contactless payment has started, the controller 20 limits manual input in response to the detection of the proximity or contact of an object with the first detection region 32, which includes the tap region indication frame 42 to which the customer holds up a credit card or a mobile terminal.

The controller 20 may limit manual input in the first detection region 32 by controlling the detector 30 such that the detector 30 does not detect the proximity or contact of an object with the first detection region 32. The controller 20 may also limit manual input in the first detection region 32 by controlling the detector 30 not to output a detection result even if the detector 30 detects the proximity or contact of an object with the first detection region 32. That is, the controller 20 may disable the function whereby the detector 30 detects the proximity or contact of an object with the first detection region 32. As a result, the controller 20 can limit manual input by not accepting manual input in the first detection region 32.

The controller 20 may also limit manual input in the first detection region 32 by lowering the detection sensitivity in the first detection region 32. For example, the detection sensitivity in the first detection region 32 may be adjusted so that an object not in contact with the first detection region 32 cannot be detected, but an object in contact can be detected.

By controlling the detection of the proximity or contact of an object with the first detection region 32 in the detector 30, the application program for achieving the contactless payment function need not execute processing for avoiding the acceptance of manual input not intended by the customer with respect to manual input in the first detection region 32 after contactless payment is started. In other words, a general-purpose program may be used as the application program for achieving the contactless payment function.

The controller 20 may control the detector 30 such that the operation of the detector 30 does not change, regardless of whether contactless payment is performed. In other words, the controller 20 may also control the detector 30 such that the detector 30 continues to detect the proximity or contact of an object with the first detection region 32 at the same detection sensitivity, both when contactless payment is being performed and when contactless payment is not being performed. In this case, even if a result indicating detection of the proximity or contact of an object with the first detection region 32 is acquired from the detector 30 after contactless payment is started, the controller 20 does not execute manual input in response to the detection. As a result, the controller 20 can limit manual input in the first detection region 32 without changing the detection operations by the detector 30. By eliminating the need for control to change the detection operations by the detector 30, an existing panel may be used without modification.

After contactless payment is started, the controller 20 limits manual input in response to the detection of the proximity or contact of an object with the first detection region 32, but on the other hand accepts manual input in response to the detection of the proximity or contact of an object with the second detection region 33. That is, the controller 20 does not limit manual input in response to the detection of the proximity or contact of an object with the second detection region 33 even after contactless payment is started. The controller 20 may also achieve the operation of limiting manual input in the first detection region 32 while accepting manual input in the second detection region 33 by controlling the detector 30 to lower only the sensitivity of the first detection region 32 while maintaining the sensitivity of the second detection region 33.

After contactless payment is started, the controller 20 performs contactless payment through communication between the communicator 50 and a credit card or a mobile terminal. Upon confirming that contactless payment is complete and determining that the credit card or mobile terminal has been moved away from the front side of the electronic device 10, the controller 20 removes the limit on manual input in the first detection region 32. The controller 20 may determine that the credit card or mobile terminal has been moved away from the front side of the electronic device 10 when the radio wave strength that the communicator 50 receives from the credit card or mobile terminal falls to or below a communication threshold.

The controller 20 may also remove the limit on manual input in the first detection region 32 after contactless payment is started and before the completion of contactless payment is confirmed. The controller 20 may accept, in the second detection region 33, a manual operation for removing the limit on manual input in the first detection region 32.

For example, the cancel button 44 located in the second detection region 33 on the contactless payment screen in FIG. 5 corresponds to a manual operation for aborting contactless payment, that is, a manual operation for removing the limit on manual input. A manual operation for removing only the limit on manual input without aborting contactless payment may also be accepted in the second detection region 33. In this way, manual input in response to the detection of the proximity or contact of an object with a partial region such as the second detection region 33 is accepted even after contactless payment is started. This can avoid a situation in which manual operations become unavailable after contactless payment is started. This improves the convenience of the electronic device 10 as a result.

The controller 20 may accept, in the first detection region 32, a manual operation for removing the limit on manual input in the first detection region 32. For example, the controller 20 acquires from the detector 30 a detection result regarding the proximity or contact of an object with the first detection region 32, and if a prescribed gesture is entered in the first detection region 32, the controller 20 may accept, in the first detection region 32, manual input for removing the limit on manual input as exception handling for the limit on manual input. The prescribed gesture may be the input of a double tap or a triple tap, or input that moves to draw a figure or character, for example.

The controller 20 may also abort contactless payment and remove the limit on manual input in the first detection region 32 if contactless payment is not complete even after a timeout time elapses from the start of contactless payment.

If the electronic device 10 is provided with a hardware key, the controller 20 may use a push-to-talk (PTT) function to assign to the hardware key a function for limiting manual input in response to the detection of the proximity or contact of an object with the first detection region 32, or a function for removing the limit. In this case, the user of the electronic device 10 can press the hardware key to switch between a state in which manual input in the first detection region 32 is limited and a state in which the limit on manual input is removed.

The controller 20 may also limit manual input over the entire detection surface 31 of the detector 30 in response to the press of a hardware key. In some cases, the electronic device 10 may have a function for entering a sleep mode if no manual operations are performed for a certain time. In such cases, limiting manual input over the entire detection surface 31 may cause the device to enter sleep mode. Accordingly, when manual input is limited over the entire detection surface 31, the controller 20 may disable sleep mode function to avoid a transition to sleep mode not intended by the user. The controller 20 may also accept only manual input for avoiding a transition to sleep mode as an exception.

In the case of disabling the function whereby the detector 30 detects the proximity or contact of an object with the first detection region 32, the controller 20 may control the electronic device 10 to accept manual input from the user by a means other than the detector 30. For example, the controller 20 may apply different assignments of hardware key functions for when the detection function of the detector 30 is enabled and when the detection function is disabled. The controller 20 may provide the user with a means of manual input by changing the function assignment of hardware keys as follows. When the detection function of the detector 30 is enabled, or in other words under normal conditions, a volume control function is assigned to the hardware keys. When the detection function of the detector 30 is disabled, or in other words during contactless payment, a function of scrolling the screen or moving a cursor is assigned to the hardware keys. When the hardware key assignment is changed, the controller 20 may display on the display 40 a function guide for the changed hardware key(s).

While manual input is limited in at least a portion of the detector 30, the controller 20 may also accept only manual input as an exception in a specific area, which may even be within the region where manual input is limited. The controller 20 may also remove the limit on manual input in the detector 30 by prescribed manual input in the specific area. The prescribed manual input may involve tapping the specific area multiple times, for example.

While manual input is limited in at least a portion of the detector 30, the controller 20 may display on the display 40 an icon or the like to indicate that manual input is limited.

The controller 20 may also turn off the display 40 in response to the press of a power key of the electronic device 10 while manual input is limited in at least a portion of the detector 30. The controller 20 may remove the limit on manual input with respect to the detector 30 when the display 40 is subsequently turned on in response to the press of the power key.

The controller 20 may also remove the limit on manual input with respect to the detector 30 when launching or relaunching the application program for providing the contactless payment function.

Example Procedure of Method for Controlling Electronic Device 10

Figure 6:
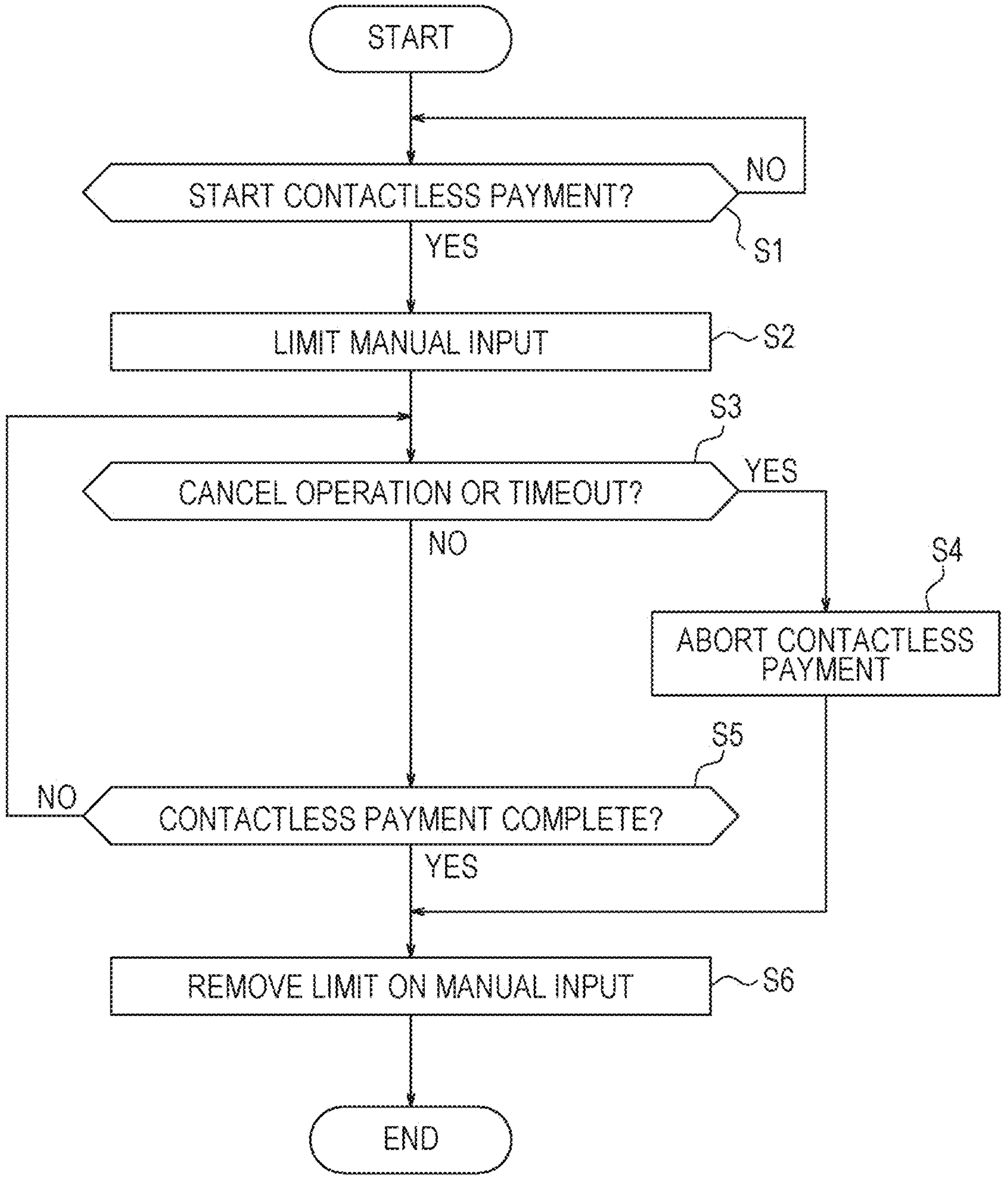
FIG. 6 is a flowchart illustrating an example procedure of a method for controlling an electronic device according to the present disclosure.

The controller 20 of the electronic device 10 may execute a control method including the procedure of the flowchart illustrated by way of example in FIG. 6. The control method may also be achieved as a control program to be executed by a processor forming the controller 20. The control program may be stored in a non-transitory computer-readable medium.

The controller 20 determines whether to start contactless payment (step S1). The controller 20 determines to start contactless payment upon accepting manual input for selecting contactless payment on the payment method selection screen in FIG. 4, for example. In the case of not determining to start contactless payment (step S1: NO), the controller 20 repeats the determination procedure in step S1 until the controller 20 determines to start contactless payment.

Upon determining to start contactless payment (step S1: YES), the controller 20 limits manual input (step S2). The controller 20 limits manual input in the first detection region 32 including the tap region indication frame 42, or in other words the first detection region 32 including the communication availability region 52 of the communicator 50, on the contactless payment screen in FIG. 5, for example. The controller 20 determines whether a contactless payment cancel operation has been performed or the timeout time has elapsed (step S3). If a contactless payment cancel operation has been performed or the timeout time has elapsed (step S3: YES), the controller 20 aborts contactless payment (step S4) and removes the limit on manual input in the first detection region 32 (step S6). After executing the procedure in step S6, the controller 20 ends execution of the flowchart in FIG. 6.

If a contactless payment cancel operation has not been performed and the timeout time has not elapsed (step S3: NO), the controller 20 determines whether contactless payment is complete (step S5). If contactless payment is not complete (step S5: NO), the controller 20 returns to the procedure in step S3.

If contactless payment is complete (step S5: YES), the controller 20 removes the limit on manual input in the first detection region 32 (step S6). After executing the procedure in step S6, the controller 20 ends execution of the flowchart in FIG. 6.

Instead of having the controller 20 determine whether contactless payment is complete, a different condition for proceeding to the procedure of removing the limit on manual input in step S6 may be used. For example, the controller 20 may determine whether the communication device such as a credit card or a mobile terminal has been moved away from the front side of the electronic device 10. Upon determining that the communication device has been moved away from the front side of the electronic device 10, the controller 20 may proceed to the procedure in step S6 and remove the limit on manual input in the first detection region 32.

The following condition may also be used to proceed to the procedure of removing the limit on manual input in step S6: after determining whether contactless payment is complete, the controller 20 further determines whether the communication device has been moved away from the front side of the electronic device 10. Upon determining that contactless payment is complete and the communication device has been moved away from the front side of the electronic device 10, the controller 20 may proceed to the procedure in step S6 and remove the limit on manual input in the first detection region 32. After contactless payment is complete, the controller 20 may repeat the determination of whether the communication device has been moved away from the front side of the electronic device 10 until the controller 20 determines that the communication device has been moved away from the front side of the electronic device 10.

Figure 7:
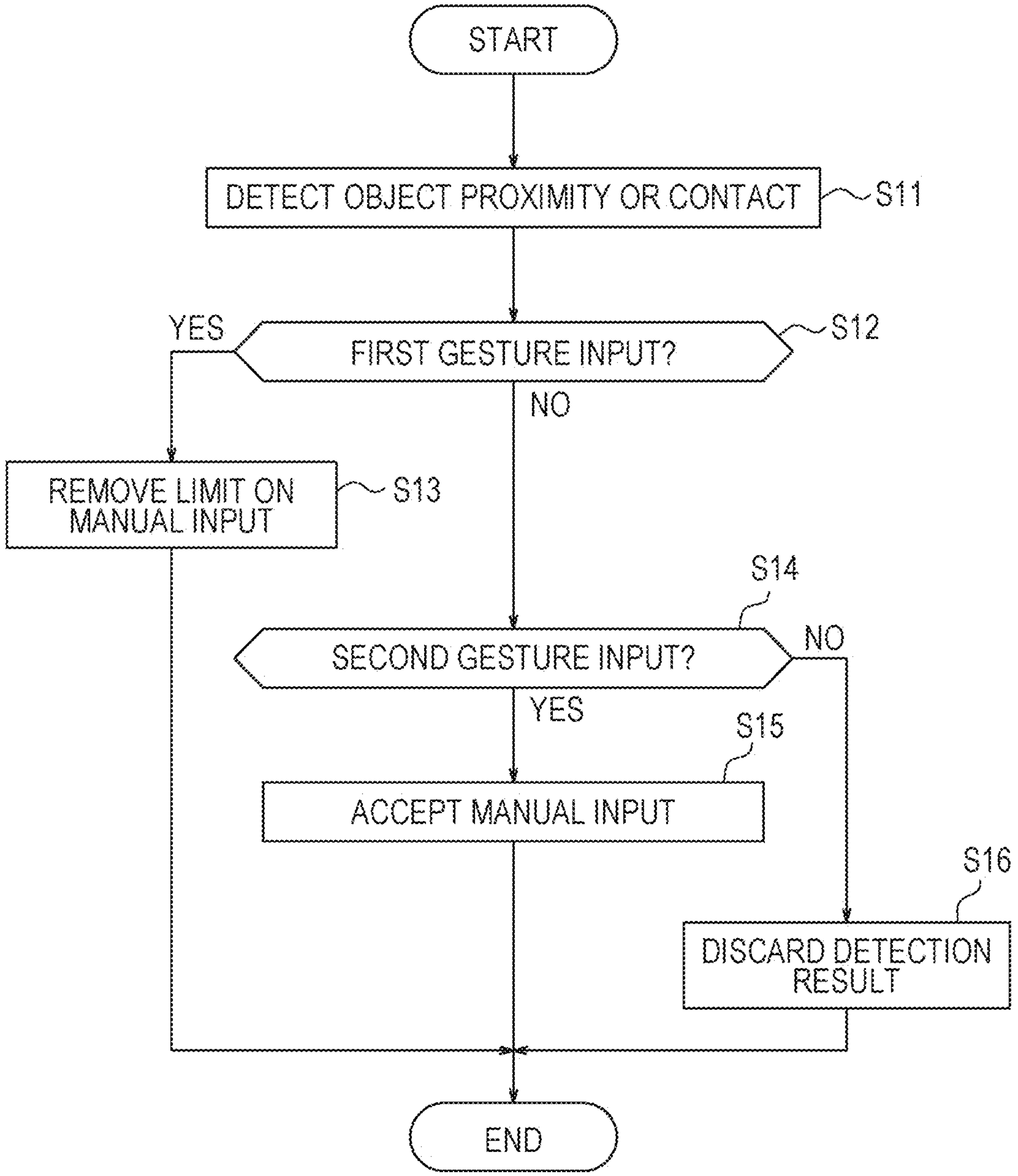
FIG. 7 is a flowchart illustrating an example procedure for accepting manual input as an exception.

The controller 20 may also execute the flowchart in FIG. 7, which includes an example procedure for accepting manual input as an exception even while manual input in the first detection region 32 is limited. The following description of the example procedure assumes that the detector 30 detects the proximity or contact of an object in the first detection region 32 and that, as a general rule, the controller 20 does not accept manual input corresponding to the detection of the proximity or contact of an object in the first detection region 32.

The controller 20 detects, via the detector 30, the proximity or contact of an object in the first detection region 32 (step S11). The controller 20 determines whether input of a first gesture is present (step S12). Upon determining that input of the first gesture is present (step S12: YES), the controller 20 removes the limit on manual input (step S13). After executing the procedure in step S13, the controller 20 ends execution of the flowchart in FIG. 7.

In the case of not determining that input of the first gesture is present (step S12: NO), the controller 20 determines whether input of a second gesture is present (step S14). Upon determining that input of the second gesture is present (step S14: YES), the controller 20 accepts manual input (step S15). After executing the procedure in step S15, the controller 20 ends execution of the flowchart in FIG. 7.

In the case of not determining that input of the second gesture is present (step S14: NO), the controller 20 discards the detection result without accepting manual input (step S16). After executing the procedure in step S16, the controller 20 ends execution of the flowchart in FIG. 7.

CONCLUSION

As described above, according to the present embodiment, the electronic device 10 enables contactless payment to be performed by having a customer using contactless payment to hold up a credit card or a mobile terminal to the same side as the operating surface of a touchscreen. This arrangement enables the customer to perform contactless payment easily by holding the credit card or mobile terminal up to the electronic device 10 while looking at the position where the credit card or mobile terminal is to be held up. A store clerk does not have to explain how to perform contactless payment to the customer or answer questions from the customer. This improves the user convenience of the electronic device 10 as a result.

The electronic device 10 does not accept manual input in response to the detection of the proximity or contact of an object in the region where a credit card or a mobile terminal is to be held up in contactless payment, but on the other hand accepts manual input in another region. This arrangement avoids manual input not intended by the user while also maintaining operability of the electronic device 10. This improves the user convenience of the electronic device 10 as a result.

The electronic device 10 according to the present disclosure is not limited to contactless payment and may also be applied to a terminal that executes short-range communication or proximity communication. In other words, according to the present disclosure, the electronic device 10 limits manual input corresponding to the detection of the proximity or contact of an object with the first detection region 32 during the period of communication processing between the communicator 50 and an external communication device brought into proximity from the detection surface 31 side, but on the other hand may accept manual input corresponding to the detection of the proximity or contact of an object with the second detection region 33. The period of communication processing between the communicator 50 and the communication device may include not only the period during which communication is actually performed, but also a period for bring the communication device into proximity before starting communication or a period for moving the communication device away after communication is performed. In other words, the period of communication processing between the communicator 50 and the communication device may be a period with the possibility of the communication device coming into proximity within the overlap region 54.

Other Embodiments

The following describes other embodiments. Automatic switching condition for disabling touch operations When gripping a terminal with a touchscreen from above, contact of the palm with the touchscreen may generate input of a manual operation not intended by the user. To avoid this, the terminal may disable manual input with respect to the touchscreen on the basis of a result of proximity detection by a proximity sensor installed underneath the screen. The terminal may also disable manual input with respect to the touchscreen upon detecting that the user is gripping the terminal, and enable manual input with respect to the touchscreen upon detecting that the grip has been released.

The content of the present disclosure enables a person skilled in the art to make various variations and revisions on the basis of the present disclosure. Therefore, these variations and revisions are included in the scope of the present disclosure. For example, in each embodiment, each function unit, means, step, or the like can be added to another embodiment or replaced by each function unit, means, step, or the like of another embodiment in logically non-contradictory ways. In each embodiment, multiple function units, means, steps, or the like can be combined into one, or each function unit, means, step, or the like can be divided. Each embodiment according to the present disclosure described above is not limited to being carried out exactly according to each embodiment as described, and can be carried out by combining features or omitting some features, as appropriate.

In one embodiment, (1) an electronic device is provided. The electronic device includes a detector, a controller, and a communicator. The detector is configured to detect an object in proximity of less than a detection distance from, or in contact with, a detection surface. The controller is configured to accept a manual operation corresponding to the proximity or contact of an object with the detector. The communicator is disposed to allow for communication with a communication device brought into proximity with the detector from the detection surface side. The detection surface has first and second detection regions. The first detection region includes a range obtained by projecting onto the detection surface a region that is less than the detection distance from the detection surface from out of a region of communication availability between the communication device and the communicator. The second detection region does not include the first detection region. In a period of communication processing between the communicator and the communication device, the controller is configured to limit manual input corresponding to the detection of the proximity or contact of an object with the first detection region, but to accept manual input corresponding to the detection of the proximity or contact of an object with the second detection region.

(2) In the electronic device according to (1) above, in the period of communication processing between the communicator and the communication device, the controller may be configured not to accept a manual operation corresponding to the detection of the proximity or contact of an object with the first detection region, even if the detector detects the proximity or contact of an object with the first detection region.

(3) In the electronic device according to (1) above, in the period of communication processing between the communicator and the communication device, the detector may be configured to make the detection distance in the first detection region shorter than the detection distance in the second detection region.

(4) The electronic device according to any one of (1) to (3) above may further include a display positioned to overlap at least a portion of the detector. In the period of communication processing between the communicator and the communication device, the controller may be configured to cause the display to display a guide corresponding to the region of communication availability between the communication device and the communicator.

(5) In the electronic device according to any one of (1) to (4) above, in the period of communication processing between the communicator and the communication device, the detector may be configured not to detect the proximity or contact of an object with the first detection region. The detector may be configured not to output to the controller an indication that the detector detects the proximity or contact of an object with the first detection region.

(6) In the electronic device according to any one of (1) to (5) above, when the detector detects that the motion of an object in proximity or contact with the detector is a prescribed gesture, the controller may be configured to remove the limit on a manual operation corresponding to the proximity or contact of an object with the first detection region, even if within the period of communication processing between the communicator and the communication device.

In one embodiment, (7) a method for controlling an electronic device is provided. The electronic device includes a detector, a controller, and a communicator. The detector is configured to detect an object in proximity of less than a detection distance from, or in contact with, a detection surface. The controller is configured to accept a manual operation corresponding to the proximity or contact of an object with the detector. The communicator is disposed to allow for communication with a communication device brought into proximity with the detector from the detection surface side. The detection surface has first and second detection regions. The first detection region includes a range obtained by projecting onto the detection surface a region that is less than the detection distance from the detection surface from out of a region of communication availability between the communication device and the communicator. The second detection region does not include the first detection region. The method for controlling an electronic device includes causing, in a period of communication processing between the communicator and the communication device, the controller to limit manual input corresponding to the detection of the proximity or contact of an object with the first detection region, but to accept manual input corresponding to the detection of the proximity or contact of an object with the second detection region.

In one embodiment, (8) a non-transitory computer-readable medium is provided. The non-transitory computer-readable medium stores a control program of an electronic device. The electronic device includes a detector, a controller, and a communicator. The detector is configured to detect an object in proximity of less than a detection distance from, or in contact with, a detection surface. The controller is configured to accept a manual operation corresponding to the proximity or contact of an object with the detector. The communicator is disposed to allow for communication with a communication device brought into proximity with the detector from the detection surface side. The detection surface has first and second detection regions. The first detection region includes a range obtained by projecting onto the detection surface a region that is less than the detection distance from the detection surface from out of a region of communication availability between the communication device and the communicator. The second detection region does not include the first detection region. The control program of an electronic device includes causing, in a period of communication processing between the communicator and the communication device, the controller to limit manual input corresponding to the detection of the proximity or contact of an object with the first detection region, but to accept manual input corresponding to the detection of the proximity or contact of an object with the second detection region.

What is claimed is:

1. An electronic device comprising:

a detector configured to detect an object in proximity of less than a detection distance from, or in contact with, a detection surface;

a controller configured to accept a manual operation corresponding to the proximity or contact of an object with the detector; and a communicator disposed to allow for communication with a communication device brought into proximity with the detector from the detection surface side, wherein the detection surface has first and second detection regions, the first detection region including a range obtained by projecting onto the detection surface a region that is less than the detection distance from the detection surface from out of a region of communication availability between the communication device and the communicator, the second detection region not including the first detection region, and in a period of communication processing between the communicator and the communication device, the controller is configured to limit manual input corresponding to the detection of the proximity or contact of an object with the first detection region based on a first detection distance that is less than the detection distance and to accept manual input corresponding to the detection of the proximity or contact of an object with the second detection region based on a second detection distance that is greater than the first detection distance.

2. The electronic device according to claim 1, wherein in the period of communication processing between the communicator and the communication device, the controller is configured not to accept a manual operation corresponding to the detection of the proximity or contact of an object with the first detection region, even if the detector detects the proximity or contact of an object with the first detection region.

3. The electronic device according to claim 2, further comprising:

a display positioned to overlap at least a portion of the detector, wherein in the period of communication processing between the communicator and the communication device, the controller is configured to cause the display to display a guide corresponding to the region of communication availability between the communication device and the communicator.

4. The electronic device according to claim 3, wherein in the period of communication processing between the communicator and the communication device, the detector is configured not to detect the proximity or contact of an object with the first detection region, or not to output to the controller an indication that the detector detects the proximity or contact of an object with the first detection region.

5. The electronic device according to claim 3, wherein when the detector detects that the motion of an object in proximity or contact with the detector is a prescribed gesture, the controller is configured to remove the limit on a manual operation corresponding to the proximity or contact of an object with the first detection region, even if within the period of communication processing between the communicator and the communication device.

6. The electronic device according to claim 2, wherein in the period of communication processing between the communicator and the communication device, the detector is configured not to detect the proximity or contact of an object with the first detection region, or not to output to the controller an indication that the detector detects the proximity or contact of an object with the first detection region.

7. The electronic device according to claim 2, wherein when the detector detects that the motion of an object in proximity or contact with the detector is a prescribed gesture, the controller is configured to remove the limit on a manual operation corresponding to the proximity or contact of an object with the first detection region, even if within the period of communication processing between the communicator and the communication device.

8. The electronic device according to claim 1, wherein in the period of communication processing between the communicator and the communication device, the detector is configured to make the detection distance in the first detection region shorter than the detection distance in the second detection region.

9. The electronic device according to claim 8, further comprising:

a display positioned to overlap at least a portion of the detector, wherein in the period of communication processing between the communicator and the communication device, the controller is configured to cause the display to display a guide corresponding to the region of communication availability between the communication device and the communicator.

10. The electronic device according to claim 9, wherein in the period of communication processing between the communicator and the communication device, the detector is configured not to detect the proximity or contact of an object with the first detection region, or not to output to the controller an indication that the detector detects the proximity or contact of an object with the first detection region.

11. The electronic device according to claim 9, wherein when the detector detects that the motion of an object in proximity or contact with the detector is a prescribed gesture, the controller is configured to remove the limit on a manual operation corresponding to the proximity or contact of an object with the first detection region, even if within the period of communication processing between the communicator and the communication device.

12. The electronic device according to claim 8, wherein in the period of communication processing between the communicator and the communication device, the detector is configured not to detect the proximity or contact of an object with the first detection region, or not to output to the controller an indication that the detector detects the proximity or contact of an object with the first detection region.

13. The electronic device according to claim 8, wherein when the detector detects that the motion of an object in proximity or contact with the detector is a prescribed gesture, the controller is configured to remove the limit on a manual operation corresponding to the proximity or contact of an object with the first detection region, even if within the period of communication processing between the communicator and the communication device.

14. The electronic device according to claim 1, further comprising:

a display positioned to overlap at least a portion of the detector, wherein in the period of communication processing between the communicator and the communication device, the controller is configured to cause the display to display a guide corresponding to the region of communication availability between the communication device and the communicator.

15. The electronic device according to claim 14, wherein in the period of communication processing between the communicator and the communication device, the detector is configured not to detect the proximity or contact of an object with the first detection region, or not to output to the controller an indication that the detector detects the proximity or contact of an object with the first detection region.

16. The electronic device according to claim 14, wherein when the detector detects that the motion of an object in proximity or contact with the detector is a prescribed gesture, the controller is configured to remove the limit on a manual operation corresponding to the proximity or contact of an object with the first detection region, even if within the period of communication processing between the communicator and the communication device.

17. The electronic device according to claim 1, wherein in the period of communication processing between the communicator and the communication device, the detector is configured not to detect the proximity or contact of an object with the first detection region, or not to output to the controller an indication that the detector detects the proximity or contact of an object with the first detection region.

18. The electronic device according to claim 1, wherein when the detector detects that the motion of an object in proximity or contact with the detector is a prescribed gesture, the controller is configured to remove the limit on a manual operation corresponding to the proximity or contact of an object with the first detection region, even if within the period of communication processing between the communicator and the communication device.

19. A method for controlling an electronic device, the electronic device being provided with a detector configured to detect an object in proximity of less than a detection distance from, or in contact with, a detection surface, a controller configured to accept a manual operation corresponding to the proximity or contact of an object with the detector, and a communicator disposed to allow for communication with a communication device brought into proximity with the detector from the detection surface side, the detection surface having first and second detection regions, the first detection region including a range obtained by projecting onto the detection surface a region that is less than the detection distance from the detection surface from out of a region of communication availability between the communication device and the communicator, the second detection region not including the first detection region, the method comprising:

causing, in a period of communication processing between the communicator and the communication device, the controller to limit manual input corresponding to the detection of the proximity or contact of an object with the first detection region based on a first detection distance that is less than the detection distance and to accept manual input corresponding to the detection of the proximity or contact of an object with the second detection region based on a second detection distance that is greater than the first detection distance.

20. A non-transitory computer-readable medium storing a control program of an electronic device, the electronic device being provided with a detector configured to detect an object in proximity of less than a detection distance from, or in contact with, a detection surface, a controller configured to accept a manual operation corresponding to the proximity or contact of an object with the detector, and a communicator disposed to allow for communication with a communication device brought into proximity with the detector from the detection surface side, the detection surface having first and second detection regions, the first detection region including a range obtained by projecting onto the detection surface a region that is less than the detection distance from the detection surface from out of a region of communication availability between the communication device and the communicator, the second detection region not including the first detection region, the program causing, in a period of communication processing between the communicator and the communication device, the controller to limit manual input corresponding to the detection of the proximity or contact of an object with the first detection region based on a first detection distance that is less than the detection distance and to accept manual input corresponding to the detection of the proximity or contact of an object with the second detection region based on a second detection distance that is greater than the first detection distance.

* * * * *